United States Patent [19]

Shoberg

[11] 4,362,218
[45] Dec. 7, 1982

[54] OVERLOAD PROTECTION FOR A WEIGH SCALE HAVING A FLEXURE BEAM

[75] Inventor: Ralph S. Shoberg, Brighton, Mich.

[73] Assignee: GSE, Inc., Farmington Hills, Mich.

[21] Appl. No.: 165,156

[22] Filed: Jul. 1, 1980

[51] Int. Cl.³ .................... G01G 23/02; G01G 3/14
[52] U.S. Cl. ................................. 177/154; 177/211
[58] Field of Search ............................. 177/211, 154

[56] References Cited

U.S. PATENT DOCUMENTS 3,938,603  2/1976  Shoberg et al. .................... 177/211
4,095,659  6/1978  Blench et al. .................... 177/154 X
4,223,752  9/1980  Belcher .......................... 177/255 X

*Primary Examiner*—George H. Miller, Jr.
*Attorney, Agent, or Firm*—Krass, Young & Schivley

[57] ABSTRACT

A weigh scale includes a flexure beam disposed between a platform and the base. Load transmitting devices operate to deflect the beam as a function of the load placed on the platform. Overload protection is provided for the beam to restrict the amount of beam deflection to maintain it within its elastic limits to thereby prevent yielding of the beam.

10 Claims, 10 Drawing Figures

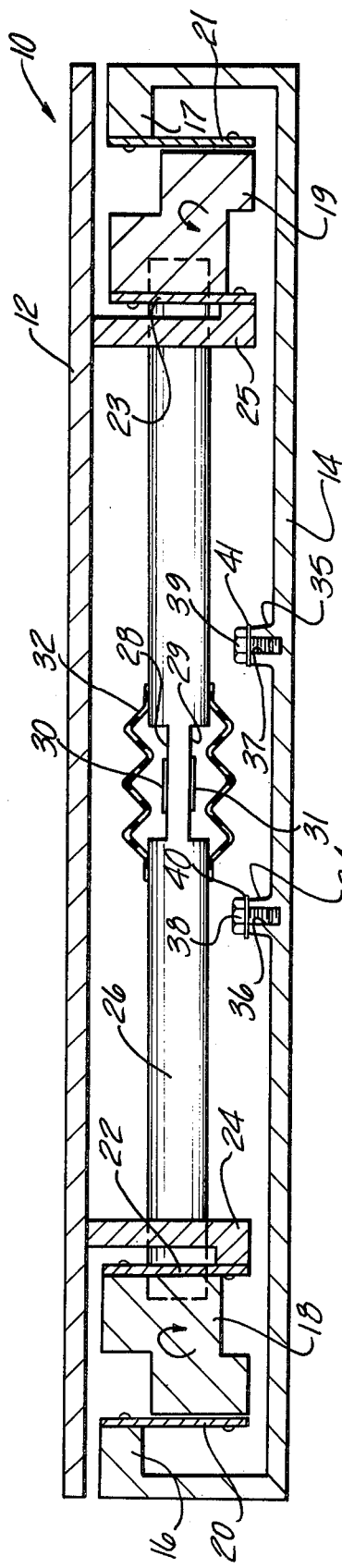
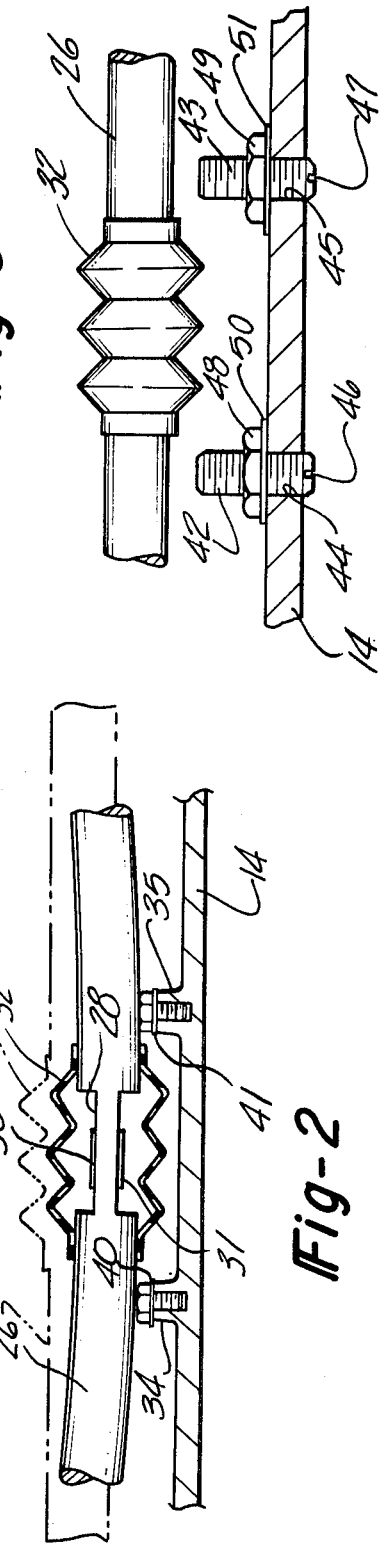

OVERLOAD PROTECTION FOR A WEIGH SCALE HAVING A FLEXURE BEAM

BACKGROUND OF THE INVENTION

This invention relates to weigh scales. More particularly, it involves techniques for protecting load sensing elements in weigh scales.

In commonly assigned U.S. Pat. No. 3,938,603, there is disclosed a weigh scale utilizing a floating flexure beam which senses the weight of a load placed on the scale. Briefly, the patented scale includes a load receiving pan or platform spaced from the base and a pair of pivot members. The beam is connected between the pivot members. Turning moments are generated in the pivot members when a load is applied to the scale platform. The turning moments cause the beam to deflect as a function of the load. Sensing means such as strain gauges are applied to central portions of the beam to provide an indication of the amount of beam deflection.

The proportional deflection of the beam with respect to the load is one of the most critical aspects of the operation of the scale. If the beam is allowed to deflect to such a degree that it exceed its elastic limits, the beam will stretch or distort such that inaccuracies would result in subsequent measurements. This phenomena is known as yielding. Although the scales are rated according to their maximum capacity, they are often subjected to excessive loads which could cause yielding and thus destroy the precise accuracy of the scale.

Preloaded springs on the rails supporting the platform have been used to prevent further rotation of the pivot members when excessive loads are applied. The preloaded springs are located about the four corners of the scale and serve to bottom out on the base after their preload strengths have been exceeded. While satisfactory protection has been provided by this technique, it does not readily lend itself to implementation in large capacity scales. This technique also may not respond quickly enough to protect against shock loads applied to the scale platform. Furthermore, a compromise in the preload strengths of the springs must be reached to provide sufficient protection against excessive off-centered as well as centered loads on the scale.

SUMMARY OF THE INVENTION

According to the teachings of this invention, overload protection for the beam is provided by way of a rigid member bridging a central portion of the beam. Preferably, the member takes the form of a tube having an inner portion which will come into contact with the beam if deflected beyond a certain amount thereby preventing yielding of the beam. In one embodiment, one end of the tube includes an inwardly directed flange portion which is affixed to the beam. In another embodiment, the entire tube is free floating. Various adjusting means are provided for adjusting the spacing between the tube and the beam.

BRIEF DESCRIPTION OF THE DRAWINGS

The various advantages of the present invention will come to light upon reading the following specification and by reference to the drawings in which:

FIG. 1 is a cross sectional view of an unloaded beamed weigh scale utilizing one embodiment of the present invention;

FIG. 2 is an enlarged partial cross sectional view of the embodiment of FIG. 1 showing the beam in an excessively loaded condition;

FIG. 3 is a partial cross sectional view showing another embodiment of the present invention;

DESCRIPTION OF THE PREFERRED EMBODIMENTS

Figure 4:
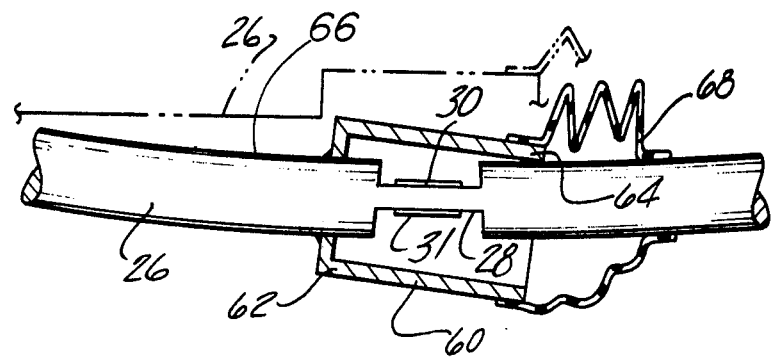
FIG. 4 is a partial cross sectional view showing an alternative embodiment.

The illustrative weigh scale apparatus 10 in FIG. 1 is designed for general purpose use and includes a flat pan or platform 12 for receiving the objects to be weighed. Platform 12 is generally rectangular as is a base 14 which includes upright side walls with an inwardly projecting flange portions 16, 17. Base 14 is effectively isolated from loads applied to the platform 12. This is accomplished by way of a pair of pivot members 18, 19 extending parallel to their adjacent side walls. Pivot members 18, 19 are connected to platform 12 by way of flexible straps 20, 22 and 21, 23, respectively. The outermost straps 20, 21 are connected at their upper ends to base flange portions 16, 17 whereas the lower portions of the straps are connected to lower portions of pivot members 18, 19, respectively. Flexure straps 22, 23 are connected at their upper ends to upper portions of pivot members, 18, 19 and their lower ends are connected to platform 12 by way of longitudinal rails 24, 25, respectively. A beam 26 is connected at its opposite ends to pivot members 18, 19. Upon application of a load to platform 12, pivot members 18, 19 rotate in opposite directions and cause the beam 26 to deflect downwardly in proportion to the weight of the load. Central portions of the beam may be provided with a web portion by way of flat surfaces 28, 29 which carry strain gauges 30, 31. Strain gauges 30, 31 provide an electrical signal which is a function of the amount of deflection of the beam 26. A protective bellows or boot 32 encompassing the web portion serves to protect the sensitive components of the strain sensing apparatus. Thus far, the weigh scale 10 is substantially that described in U.S. Pat. No. 3,938,603 which is hereby incorporated by reference.

In FIGS. 1 and 2, overload protection for beam 26 is provided by way of a pair of bosses 34, 35 which project upwardly from the bottom surface of base 14. Preferably, bosses 34, 35 are cast integrally with base 14. Bosses 34, 35 are aligned with beam 26 and are spaced as close as possible to the webbed cental portion thereof without interferring with boot 32. A four inch spacing between bosses 34, 35 has proved satisfactory.

Bosses 34, 35 include centrally tapped bores 36, 37, respectively. Screws 38, 39 have threaded shafts which engage the boxes 36, 37 in their respective bosses. Shims 40, 41 disposed between the head of screws 38, 39 and the upper surface of bosses 34, 35 may be conveniently utilized to adjust the spacing between the head of the screws and the lower portions of beam 26. The spacing is preferably between about 0.01 inch and 0.03 inch depending upon the capacity of the scale. The spacing is with reference to the beam 26 being in an unloaded condition such as shown in FIG. 1. The shims 40, 41 may have resilient properties such as those possessed by rubber or Belville washers.

FIG. 2 shows the operation of the overload protection devices when the beam has encountered an excessive load condition. The amount of deflection is exaggerated in the drawings to more particularly illustrate the operation of the invention. In such an overload condition the beam 26 strikes the head of screws 38, 39 to restrict further deflection of the beam 26. The initial spacing therebetween is chosen such that the beam is allowed to deflect within its elastic limits over the normally encountered range of loads but will strike the projections from base 14 when excessive loads are applied to platform 12. In such manner it is insured that the beam 26 is deflected only within its elastic limits and does not pass the yield point in which beam 26 may exhibit distortion causing inaccuracies in subsequent weigh scale measurements.

After the beam 26 strikes the projections the beam 26 ceases to float and further loads are transferred directly to the base 26.

FIG. 3 illustrates another embodiment in which the projections take the form of set screws 42, 43. Tapped openings 44, 45 extend completely through the lower surface of base 14 and engage the threaded shafts of screws 42, 43. Sockets 46, 47 in screws 42, 43 are accessible from the exterior of base 14. Appropriate wrenches may be utilized to engage sockets 46, 47 to rotate them until the upper ends of screws 42, 43 are spaced the appropriate distances from beam 26. Jam nuts 48, 49 operate to lock screws 42, 43 in place after adjustment. Washers 50, 51 may be used to aid in the locking process.

Another concept for providing overload protection for beam 26 is shown in FIGS. 4-8. In this embodiment a tube 60 bridges the central portion of beam 26 which contains the strain gauges. Tube 60 includes inwardly directed flange 62 which is rigidly attached to one side of the flattened portion of beam 26, for example, by welding. The longitudinal walls of the tube 60 are spaced a predetermined distance from beam 26 when in an unloaded condition. If beam 26 is deflected beyond a certain amount, the free floating end 64 will engage the compression side 66 of beam 26. Tube 60 is preferably made of a material that has a higher spring rate than beam 26. For example, if the beam 26 is made of aluminum, tube 60 may be made of steel. As shown in FIG. 4 with the beam 26 undergoing substantial deflection, tube 60 provides a generally paralleling moment reaction path over the central portions of the beam undergoing the most deflection. Once end 64 has engaged beam 26 further deflection of the beam is restricted. Again, the space between the inner walls of tube 60 and beam 26 will depend upon the capacity of the beam and is chosen so that the yield point of the beam is not exceeded when excessive loads are encountered. A smaller boot 68 can be used which extends from the outer surface of tube end 64 to beam 26, the flange 62 completing the enclosure for the sensitive sensor elements.

Figure 5:
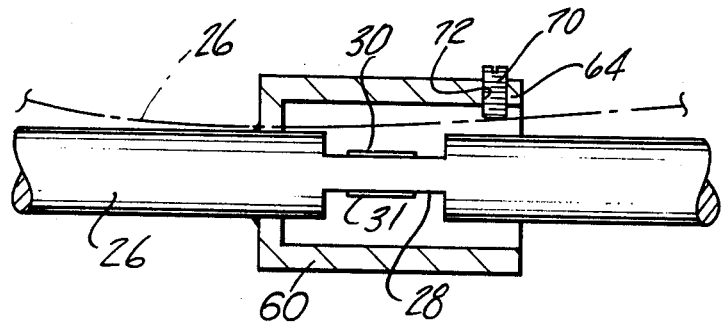
FIG. 5 is a partial cross sectional view showing a modification of the overload protection device shown in FIG. 4 with the beam in an unloaded position.
Figure 6:
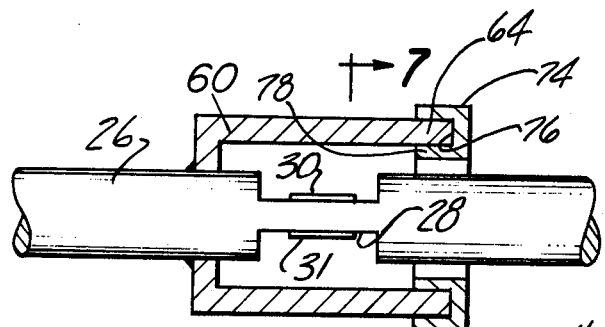
FIG. 6 is a partial cross sectional view showing another modification of the overload protection device of FIG. 4 with the beam in an unloaded condition.
Figure 7:
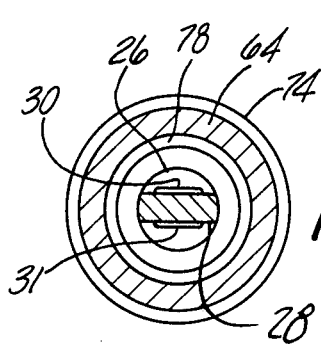
FIG. 7 is a sectional view along the lines 7—7 of FIG. 6.

Various methods of adjusting the spacing between tube 60 and beam 26 are shown in FIGS. 5-8 in which the beam is shown in an unloaded condition. In FIG. 5, a set screw 70 extends through a tapped opening 72 in the wall of tube 60 near end 64. The distance between the lower end of screw 70 and beam 26 may be readily adjusted by rotating screw 70 and locking it in place by a variety of means. In FIG. 6, the spacing adjustment is accomplished by way of an annular cap 74 having a concentric groove 76 which snaps onto one end 64 of tube 60. A lip portion 78 of cap 74 projects between the inner surface of the walls of the tube 60 and beam 26. A variety of caps having different lip portion thicknesses may be kept in stock and used to provide the desired spacing.

Figure 8:
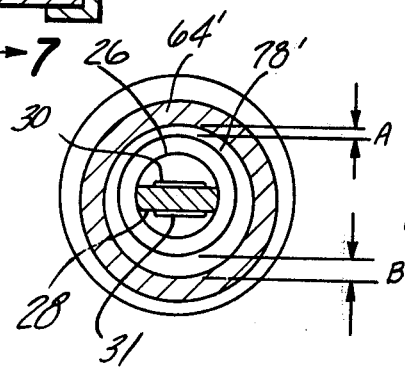
FIG. 8 is a view similar to FIG. 7 showing another modification.

Alternatively, the groove 76 may be eccentric as shown in FIG. 8 to provide lip portion 78' with varying peripheral thicknesses as noted at dimensions labled A and B in the FIGURE. In such case the cap is angularly positioned until the lip portion with the desired thickness is disposed between the compression side of beam 26 and tube end 64.

Figure 9:
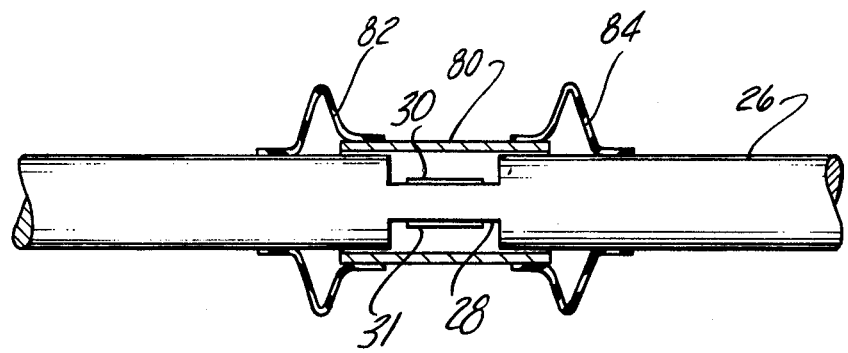
FIG. 9 is a cross sectional view of still another embodiment with the beam in an unloaded condition.
Figure 10:
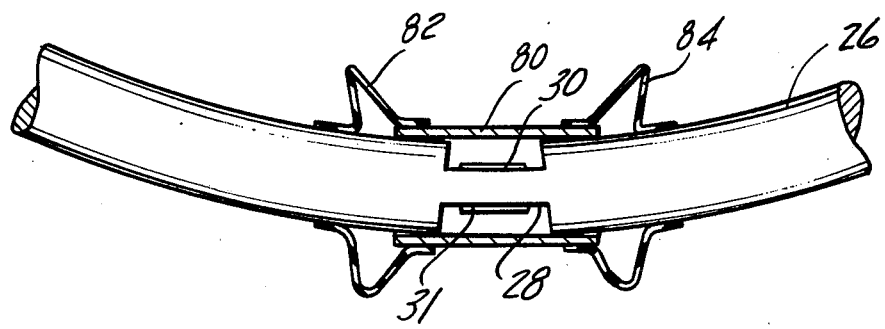
FIG. 10 is a cross sectional view like FIG. 9 with the beam in an excessively loaded condition.

Another embodiment of this concept is shown in FIGS. 9 and 10. Here, a simple tube 80 effectively floats over central portions of the beam 26 when in an unloaded condition as illustrated in FIG. 9. The tube 80 is not connected to beam 26 via flange 62 as in the previous embodiment but is held laterally in place by way of two boots 82 and 84. When beam 26 is excessively loaded as shown in FIG. 10 the inner walls of the tube come into contact with the beam 26 to provide rigid structure paralleling the flattened strain gauge carrying portion of the beam to restrict further deflection and prevent yielding thereof. The relative diameter of tube 80 with respect to beam 26 is again chosen according to the specifics of the beam as should now be evident to one skilled in the art.

It will be appreciated that the reduced cross sectional area of the central portion of beam 26 will undergo the most deflection due to the moments provided by pivot members 18, 19 and therefore the overload protection techniques are particularly concerned with protecting this portion of the beam since the remaining portions thereof are substantially more rugged. It should be noted that while a tubular structure is envisioned as the most convenient way of providing the necessary strength, and will restrict beam deflection in all directions, other configurations will become apparent upon study of the specification, drawings and the following claims.

I claim:

1. A weigh scale comprising at least one beam, a base, a platform, load transmitting means for deflecting the beam as a function of the load placed on the platform, sensor means on central portions of the beam for providing a signal relating to the amount of deflection, and rigid overload protection means carried by the beam and generally bridging the central portion of the beam adapted to engage the beam when deflected beyond a certain amount to restrict further deflection of the beam to prevent yielding thereof.

2. The scale of claim 1 wherein said overload protection means has a higher spring rate than said beam.

3. The scale of claim 2 wherein said overload protection means is a tube.

4. The scale of claim 2 wherein said overload protection means comprises:

a tube encompassing said sensor means and having an inwardly projecting flange rigidly connected to said beam on one side of said sensor means, operative to space the inner surface of the other tube end a predetermined distance from the beam in an unloaded condition, with said other tube end engaging the beam when deflected beyond a certain amount to prevent yielding thereof.

5. The scale of claims 3 or 4 which further comprises adjustment means for adjusting the spacing between said tube and the beam.

6. The scale of claim 5 wherein said adjustment means comprises a screw extending through a tapped opening in the tube.

7. The scale of claim 5 wherein said adjustment means comprises:

an insert having a groove for mating with a portion of the tube, and said insert having a lip portion disposed between the beam and the inner surface of the tube.

8. The scale of claim 7 wherein said insert comprises an annular member having an eccentric groove to provide said lip portion with varying thicknesses.

9. A weigh scale comprising:

a base, a platform spaced from the base, first and second pivot members disposed between the base and the platform, a beam having a given diameter connnected between the pivot members, load transmitting means for producing moments in the pivot members to deflect the beam as a function of a load applied to the platform, a central portion of the beam having a reduced cross sectional area, sensor means on said central portion of the beam for creating a signal relating to the deflection thereof, a tube having an inner diameter greater than said beam, said tube bridging said central portion of and being stiffer than said beam, said tube having portions adapted to engage the beam when deflected beyond a certain amount to prevent yielding thereof.

10. The scale of claim 9 which further includes means for restricting lateral movement of said tube on the beam.

* * * * *